(No Model.)

T. LINKE.
LIQUID FILTER.

No. 554,280. Patented Feb. 11, 1896.

WITNESSES:
William Goebel.
Richard Lips.

INVENTOR
Theodore Linke
BY
Adam C. Schatz
ATTORNEY

UNITED STATES PATENT OFFICE.

THEODORE LINKE, OF NEW YORK, N. Y.

LIQUID-FILTER.

SPECIFICATION forming part of Letters Patent No. 554,280, dated February 11, 1896.

Application filed May 1, 1895. Serial No. 547,782. (No model.)

*To all whom it may concern:*

Be it known that I, THEODORE LINKE, a citizen of the United States, and a resident of New York, in the county of New York and State of New York, have invented a certain new and useful Improved Liquid-Filter, of which the following is a specification.

My invention relates to that class of filters in which the water is passed through artificial or natural stone filtering medium which is incased within a glass or metal bulb or allowed to pass through and out of the bulb without passing through the filtering medium in order to obtain large quantities of unfiltered water. With a filter of this type and constructed according to this present invention, when it is desired to draw filtered water the draw-cock at the bottom is closed and the water is forced through the filtering medium and into the space between the filter and the bulb and drawn through an opening communicating directly with the space between the said filter and bulb.

The object of my present invention is to simplify and to produce in more practical and economical form a filter of this type; and to this end my invention consists in the construction and combination of parts, substantially as described.

Figure 1:
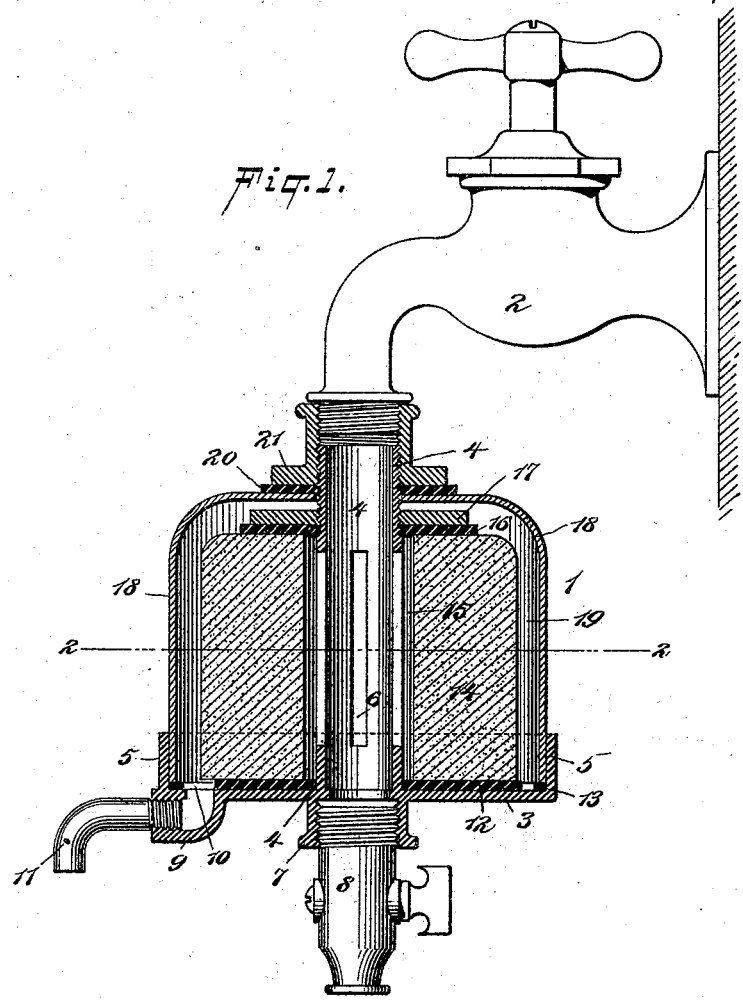
Figure 2:
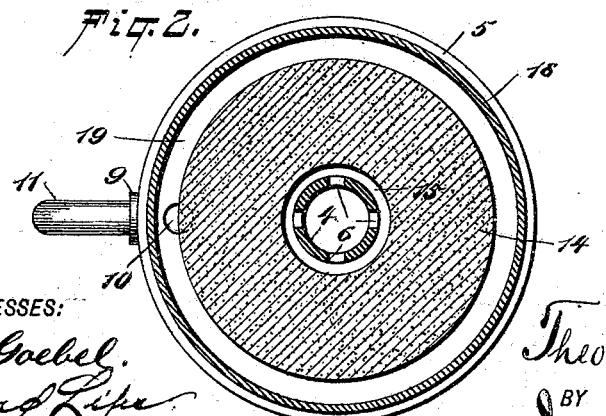

In the accompanying drawings, Figure 1 represents my improved filter in vertical section and attached to an ordinary faucet or spigot. Fig. 2 is a section on line 2 2 of Fig. 1.

In both figures similar reference-numerals are used to indicate the same parts.

The filter, as a whole, is indicated by the numeral 1 and is attached to a faucet or spigot 2.

The filter-base is formed by a disk of metal 3 and has a central pipe 4 and the outer flange 5 preferably cast with it, the pipe having elongated openings, as at 6. A neck 7, also preferably cast with the base, is internally threaded to receive the draw-cock 8, and the disk is provided with a nipple 9 which communicates with the space inside the bulb by means of an opening 10. A small pipe 11 is screwed into the nipple 9. Packing material 12 is placed on the disk 3, and a ring-washer 13 also rests on the disk adjacent to the flange 5.

The stone or other suitable filtering material 14 is placed on the packing 12 and has a central vertical opening 15 to receive the pipe or tube 4, and a washer 16 is interposed between the top of the stone and a nut 17 which is screwed over the tube and clamps together the parts so far described.

The casing or bulb 18, which in practice is preferably of glass, has an opening in the center to surround the tube 4 and rests on the washer 13, and is slightly larger than the stone to provide an annular chamber 19.

A washer 20 serves to make a tight joint between the top of the bulb and the flange of a thimble 21, by means of which the device is secured to the spigot 2.

In operation, when it is desired to draw filtered water it is only necessary to close the draw-cock, and the water, passing through the slots or perforations of the tube 4, is forced by the ordinary pressure through the filtering-stone and passes into the space 19, and from thence directly out through the pipe 11. When it is desired to draw unfiltered water, it is only necessary to open the draw-cock 8. The water passing through the tube 4 is highly agitated, and the filter is thus cleansed, and any sediment that may have lodged thereon is removed, and thus the filtering medium is kept clean.

By this invention I have reduced filters of this type to their simplest form and am enabled to furnish a cheap filter adapted to the use of every householder, while in no way impeding the flow of large quantities of unfiltered water for ordinary kitchen use, thus overcoming the objections so often raised by servants.

It is well known that the process of good filtering is slow, and that is the reason why most filters are discarded by servants, because it requires so much time to filter. To provide against this and to have a large quantity of filtered water on hand, I may attach a piece of tubing to the outlet-pipe 11 and conduct the water away and into any storage-receptacle without interfering with the drawing of unfiltered water in any desired quantity for general purposes.

Of course I do not limit myself to any particular form of filtering medium, as I may use porcelain, natural or artificial stone, or other medium, and the bulb may be of any suitable material; but I prefer the form and material as shown and described above.

Having now described my invention, what I claim is—

A filter comprising in its construction the disk 3, having the outer flange 5, the upwardly-projecting central pipe 4 provided with openings and unobstructed throughout its length and the internally-threaded neck 7 provided with a draw-cock 8, a solid piece of filtering material 14 surrounding the pipe 4, the nut 17 screwed on said pipe 4, the casing 18, the thimble 21, the outlet-pipe 11, and suitable packing material above and below the filtering material and between the casing and the disk 3 and thimble 21 between which the casing is clamped.

Signed at New York, in the county of New York and State of New York, this 8th day of April, A. D. 1895.

THEODORE LINKE.

Witnesses:
HENRY F. LIPPOLD,
ADAM E. SCHALZ.